United States Patent [19]

Wan et al.

[11] Patent Number: 4,624,940

[45] Date of Patent: Nov. 25, 1986

[54] HIGH TEMPERATURE CATALYST COMPOSITIONS FOR INTERNAL COMBUSTION ENGINE

[75] Inventors: Chung-Zong Wan, Somerset; Joseph C. Dettling, Howell, both of N.J.

[73] Assignee: Engelhard Corporation, Menlo Park, N.J.

[21] Appl. No.: 722,905

[22] Filed: Apr. 12, 1985

[51] Int. Cl.$^4$ .................. B01J 21/04; B01J 23/10; B01J 23/44

[52] U.S. Cl. .................... 502/251; 502/262; 502/263; 502/303; 423/213.5

[58] Field of Search ............... 502/251, 262, 263, 303; 423/213.5

[56] References Cited

U.S. PATENT DOCUMENTS

| | | | |
|---|---|---|---|
| 3,524,721 | 8/1970 | Stephens | 423/213.5 |
| 3,741,725 | 6/1973 | Graham | 423/213.5 |
| 3,894,140 | 7/1975 | Warshaw | 502/304 X |
| 4,367,162 | 1/1983 | Fujitani et al. | 502/304 X |
| 4,392,988 | 7/1983 | Dobson et al. | 502/263 X |

Primary Examiner—W. J. Shine

[57] ABSTRACT

Catalysts having three types of particles dispersed on a monolith have surprising oxidation and three-way activity even after exposure to temperatures above 1000° C. The particle types are: (1) palladium dispersed on stabilized alumina; (2) ceria-containing promoter particles and (3) washcoat stabilization particles.

14 Claims, No Drawings

HIGH TEMPERATURE CATALYST COMPOSITIONS FOR INTERNAL COMBUSTION ENGINE

BACKGROUND

Heavy duty trucks normally operate extremely fuel rich when maximum power is required. When emissions controls are mandated for these vehicles in the near future, extremely robust catalysts will be required since the large amounts of carbon monoxide and unburned hydrocarbons in the exhaust will result in extremely high catalyst operating temperatures at least during the maximum power portion of the cycle. Typically, heavy duty gasoline engines are operated at rich air-to-fuel ratios for maximum power output resulting in high levels of carbon monoxide in excess of 3% and unburned hydrocarbons greater than 100 ppm in the exhaust. In contrast, modern automotive exhaust usually contain about 1 to 2% carbon monoxide and 300 ppm of unburned hydrocarbons. Thus, while peak catalyst operating temperatures in the neighborhood of 700° to 800° C. are common in automobiles, inlet temperatures of 700° and peak operating temperatures around 1300° C. are expected for heavy duty trucks. Further, average catalyst operating temperatures for heavy trucks of over 800° C. are anticipated for much of the time that the engine is operating at 75% of maximum load. Thus, it can be appreciated that the catalysts to be used for heavy duty trucks will need to be capable of withstanding temperatures far in excess of the temperatures presently encountered in automotive catalysts.

In conventional monolithic catalysts, the conventional alumina supports for the catalytic metals are stabilized with oxides such as alkaline earths, rare earths, zirconium oxide or silicon dioxide. However, the stabilized aluminas presently used are not normally sufficiently stable to provide the required surface area after prolonged exposure to high temperature.

Platinum metal catalysts, especially palladium, supported on ceria modified alumina have found particular utility as pollution abatement catalysts as described in U.S. Pat. No. 3,993,572. As disclosed in U.S. Pat. No. 3,956,188 and U.S. Pat. No. 4,170,573, similar catalyst compositions have been found useful for high temperature applications including catalytically oxidizing a fuel in a combustion operation for purposes of energy production. However, these catalysts will not necessarily have sufficient durability for heavy duty applications.

Simple bare metal oxides have been demonstrated to be useful in CO oxidation as reported in J. Catalysis, 12, 364 (1968) by Shelef, et al. However, these oxides are often not sufficiently stable thermally and they tend to react with alumina to form either an aluminate spinel (in the case of Mg, Mn, Co, Ni, Cu, Zn and Fe) or a perovskite (in the case of La, Y and Nd), thereby accelerating deterioration of the alumina support, Thus, even though catalysts for oxidation of carbon monoxide are well known, it has not been known how to achieve this result repeatedly after exposure to high temperatures and the art has continued to search for catalyst compositions which are stable at higher temperatures.

INVENTION

The present invention is directed to fulfilling this need in the art by providing a catalyst composition which comprises at least three types of particles dispersed on a ceramic substrate: thermally stable alumina support particles having a platinum group metal dispersed thereon, catalytic promoter metal oxide particles which are substantially free of platinum group metal, and particles of an inert thermally stable filler material.

The alumina support materials which are suitable for the present invention are either lanthanum/barium stabilized alumina or silicone stabilized alumina as disclosed in U.S. Application Ser. No. 696,946 filed Jan 31, 1985. The combination of lanthanum and barium is found to provide better hydrothermal stabilization of alumina than lanthanum or barium alone or other combinations of rare earth oxides and alkali earth metal oxides. The use of a combination of rare earth and alkaine earth metal oxides to stabilize alumina is described in U.S. Pat. No. 3,894,140, yet this patent does not disclose the superiority of the particular combination of lanthana and baria. U.S. Pat. No. 3,524,721 suggests the use of lanthanum and barium as promoters in catalysts for reducing nitrous oxides. Throughout this application, lanthanum oxide should be understood to include mixtures of rare earth oxides consisting predominantly of lanthana but possibly also including minor amounts of ceria, praseodymia, neodymia and the other rare earths. Preferred are naturally derived compositions such as those coming from monazite and bastnazite sands from which most of the ceria content has been removed. Suitable compositions include at least about 50% lanthana, up to about 10% praseodymia, up to about 25% neodymia and no more than about 15% ceria. Stabilization of the gamma alumina is accomplished by impregnating an aqueous solution containing stabilizer precursors onto alumina particles, drying, and then calcining at a temperature sufficiently high to effect the stabilization. The modified alumina is further impregnated with a platinum group metal, preferably palladium, preferably from a thermally decomposable compound such as $PdCl_2$, which is fixed using either hydrazine or hydrogen sulfide providing a high degree of dispersion of palladium on the stabilized alumina.

Catalytic promoter oxides suitable for the present invention are selected from the group consisting of $Cr_2O_3$, $TiO_2$, $ZrO_2$ and $CeO_2$. These oxides do not readily react with alumina in high temperature lean exposure to form a spinel or perovskite. $CeO_2$ and $ZrO_2$ are preferred oxides since they appear to demonstrate a more pronounced CO promoting effect. It appears that these oxides can contribute significantly to oxidation activity at temperatures above 800° C. Since these oxides are not sufficiently effective when they are dispersed on alumina, it is advantageous to incorporate these promoting oxides in the bulk or unsupported state, Ceria being advantageously present in a weight in excess of 20%, preferably 25%, of the total weight of particles dispersed on the substrate. It is also preferred that most, if not all, of the palladium is dispersed elsewhere than on these oxide particles since otherwise a higher sintering rate and undesirable interactions will be difficult to avoid, if not unavoidable, and thus, the effectiveness of both the palladium and the promoter will be impaired if the palladium is dispersed upon particles containing more than about 0.5% ceria by weight.

In order to improve the washcoat integrity upon high temperature exposure occurring in an exhaust from a heavy duty truck engine, a thermally stable inert filler material is incorporated in the washcoat. The use of these filler materials is discussed in U.S. Application Ser. No. 569,645 filed Jan. 10, 1984 as a continuation-inpart of U.S. Application Ser. No. 466,183 filed Feb. 14, 1983. Particles of cordierite, mullite, magnesium aluminum titanate and mixtures thereof are the preferred filler materials as they demonstrate desirable thermal expansion properties. It is found that washcoats containing particles of the filler materials maintain their integrity even after exposure to a flame at 1370° C.

The object of this invention is achieved by applying a washcoat consisting essentially of an aqueous dispersion of these three different types of particles to a thermally stable ceramic monolith such as cordierite, mullite or magnesium aluminum titanate, then drying and calcining. The first type of particles are palladium bearing alumina particles stabilized with either an aqueous dispersion of an organopolysiloxane or a combination of lanthana and baria. The second are promoting oxide particles chosen from the group consisting of ceria, zirconia and mixtures thereof, while the third are particles of filler materials chosen from the group consisting of mullite, cordierite, and magnesium aluminum titanate. The amount of stabilized alumina present on the substrate suitably varies from between about 0.2 g/in$^3$ to about 5 g/in$^3$, the amount of filler from about 0.05 to about 1.0 g/in$^3$ and the level of promoter from about 0.1 to about 2 g/in$^3$ the weight of promoter being preferably at least about 5% of the total weight of the particles dispersed on the substrate and the amount of palladium present being in excess of 5, preferably in excess of 10 and more preferably in excess of 15 grams per cubic foot. Preferably, the amount of stabilized alumina will be between about 0.5 to about 3 g/in$^3$, the amount of filler between about 0.1 and about 0.6 g/in$^3$, and the amount of promoter will be between about 0.2 and about 1.5 g/in$^3$. If a combination of lanthana and baria is used to stabilize the gamma alumina, the amount of lanthana and baria each should be at least about 0.3% of the weight of the gamma alumina. If an aqueous dispersion of a polyorganosiloxane is used to stabilize the gamma alumina, the amount used should be sufficient to provide, after calcination, from about 1 to about 20 percent by weight $SiO_2$ and preferably from about 4 to about 15 percent by weight of $SiO_2$ based upon the combined weight of silica and alumina. These catalyst compositions exhibit especially surprisingly durability in high temperature applications remaining effective even after exposure to temperature in excess of 1000° C.

EXAMPLE I

Various modified aluminas containing 0.8% BaO (from barium nitrate), 20% $CeO_2$ (from 95% cerium nitrate), 13% $ZrO_2$ (from zirconium nitrate), 5% $La_2O_3$ (from lanthanum nitrate), 1.65% of a lanthanum rich mixture of rare earth oxides (La-REO) together with 1.35% BaO (all from nitrates) and 10.2% $SiO_2$ from silicone following procedures described in Example I of U.S. Application Ser. No. 696,946 respectively were prepared by impregnating a gamma alumina powder with the various oxide stabilizers containing precursor solution.

For purpose of direct comparison, the unmodified gamma alumina, a bulk cerium oxide (95% $CeO_2$) and the various modified aluminas were calcined in air in a muffle furnace at 1200° C. for one hour. After aging, the samples were analyzed for BET surface area and for alumina structure by XRD technique. The results of illustrating the efficiency of alumina stabilization are recorded in Table I.

It is immediately demonstrated that cerium oxide, zirconium oxide, barium oxide and lanthanum oxide are not effective in alumina stabilization at temperatures above 1200° C. In fact, it is found that the cerium oxide incorporated in the alumina agglomerates to a crystallite size comparable to that of the bulk ceria after the high temperature exposure. Although either lanthanum or barium alone does not provide significant improvement in thermal stability after 1200° C. exposure, a combination of lanthanum and barium demonstrates larger improvement of the thermal stability of alumina. Further, lanthana and baria are superior to the other combinations of rare earths and alkaline earths (see Example VII). However, gamma alumina stabilized with silicone according to the method described in U.S. Application Ser. No. 696,946 achieves a substantial improvement in thermal stability.

EXAMPLE II

A palladium containing catalyst was prepared in accordance with the following procedure:

One hundred (100) grams of gamma alumina powder stabilized with 0.8% BaO was impregnated with an aqueous $PdCl_2$ solution containing 0.5 grams palladium, thereafter 3 ml of a dilute (10%) solution of $N_2H_4$ was added to the wet powder to reduce the Pd species and fix it on the alumina particles. The particle size of the palladium containing alumina was then reduced by ballmilling with 107 grams of blank gamma alumina, water and acetic acid to form a washcoat slurry.

A monolithic support of cordierite containing about 400 flow passages per square inch of cross-section was dipped into the washcoat slurry. The excess was blown off the monolith by compressed air, and the monolith was dried and calcined at 500° C. to provide a 5 g/ft$^3$ palladium loading on the monolith. A core 1.5 inches in diameter and 3 inches in length was cut and separated from the monolith. The core was loaded in a laboratory reactor and aged on an engine for 4 hours (maximum inlet temperature 720° C.). After aging, the Pd containing monolith was evaluated in a reactor mounted on an engine dynomometer wherein the air-to-fuel ratio (A/F) was fluctuated ±1.0 A/F units at 1.0 Hz perturbations, an A/F of 14.65 being taken as the baseline of unit zero (the stoichiometric set point). The evaluation was performed at an inlet temperature of 400° C. and an exhaust gas flow rate of 80,000 volumes of gas per volume of catalyst per hour. The catalytic efficiency of the monolith at above described conditions is summarized in Table II.

For purposes of comparison, the procedure of Example II was repeated with the exception that the alumina supported for Pd was replaced by bulk $CeO_2$ having surface area 140 m$^2$/g. The monolith coated with this comparative washcoat is designated "$C_1$." The catalytic efficiency of $C_1$ under the conditions used in Example II is also summarized in Table II.

It is apparent that the catalyst containing Pd supported on alumina provided conversion performance superior to that obtained using a catalyst containing Pd supported on $CeO_2$. Separate experiments demonstrate that catalysts containing Pd supported on La-Ba stabilized alumina and Pd supported on silicone stabilized alumina provided conversion performance essentially equivalent to that containing Pd supported on alumina stabilized with 0.8% BaO but with improved high temperature stability. It is believed that a catalyst containing Pd supported on $CeO_2$ particles will suffer from higher Pd sintering rate or an adverse Pd-CeO$_2$ metal support interaction, Thus, it is advantageous not to place Pd on CeO$_2$ particles.

EXAMPLE III

A La-Ba stabilized alumina containing 1.65% of a lanthanum rich combination of rare earths containing 60% La$_2$O$_3$, 10% CeO$_2$, 22% Nd$_2$O$_3$ and 8% Pr$_6$O$_{11}$ (La-REO) and 1.35% BaO was ballmilled with water and acetic acid to form a slurry. This slurry was contacted with an aqueous PdCl$_2$ solution and treated with H$_2$S. The monolith containing 400 cells/in$^2$ was coated with the above slurry so as to give 20 g Pd/ft$^3$ loading.

For comparison, a catalyst of similar Pd loading was prepared in which the La-Ba stabilized Al$_2$O$_3$ contained 6.6% CeO$_2$ before the Pd was impregnated on the support. The coated monolith with this comparative washcoat is designated "C$_2$." The light-off performance of C$_2$ is compared to catalyst of Example III in Table III under the conditions described.

It is apparent that the light-off performance of Pd supported on alumina was superior to that obtained using a catalyst in which the Pd is in intimate contact with the CeO$_2$.

EXAMPLE IV

A stabilized alumina containing 1.65% La-REO and 1.35% BaO was ballmilled with water and acetic acid to form a slurry. The resulting slurry was treated with an aqueous PdCl$_2$ solution then fixed with H$_2$S. In a separate ballmill, crushed cordierite and bulk CeO$_2$ was combined with water and milled to give a particle size similar to the Pd stabilized alumina. The two slurries were combined and a 400 cell/in$^2$ monolith was coated so as to give 15 g Pd/ft$^3$ catalyst loading. The amount of stabilized alumina present was 1.2 g/in$^3$, the cordierite content was 0.2 g/in$^3$ and the bulk CeO$_2$ level was 0.6 g/in$^3$ within the washcoat.

EXAMPLE V

A catalyst was prepared in a similar fashion as described in Example IV except that the stabilized alumina was a silicone treated alumina (stabilized with a polyorganosiloxane as described in U.S. Application Ser. No. 696,946) and the bulk oxide was ZrO$_2$. The resulting catalyst had a 15 g Pd/ft$^3$ loading with 1.2 g/in$^3$ stabilized alumina, 0.4 g/in$^3$ cordierite and 0.15 g/in$^3$ bulk ZrO$_2$ within the washcoat.

For comparative purposes, a catalyst with a similar Pd loading was prepared and in which the Pd was supported on an alumina containing 20% CeO$_2$. The amount of stabilized alumina containing CeO$_2$, cordierite and bulk ZrO$_2$ within the washcoat is the same as that of the above catalyst. The coated monolith with this comparative washcoat is designated "C$_3$." A comparison of the light-off performance of catalyst C$_3$ is made to catalysts of Examples IV and V as seen in Table IV under the conditions described.

It is apparent that both catalysts of Examples IV and V are superior to the catalyst having the Pd deposited on the CeO$_2$ containing alumina particles. After high temperature aging, it can be seen that the catalysts in which the Pd was not in contact with the CeO$_2$ outperformed the catalyst in which the Pd was in contact with CeO$_2$.

EXAMPLE VI

The catalyst of Example IV was aged in a cyclic manner at temperatures of 1370° C. in air for 8 hours. The test consists of passing a catalyst sample over a flame at 1370° C. for 4.5 seconds, and subsequently moving to 3 successive stations in which an air blast cools the sample for a period of 13.5 seconds. The catalyst spends 25% of its time at temperature in this test.

After aging, the catalyst was examined with a microscope and excellent washcoat adhesion was observed. The catalyst was then evaluated under the conditions described in Table V. The activity of the catalyst for converting all three exhaust constituents after this vigorous aging is quite high. This indicates that for heavy duty bulk applications this Pd only catalyst will be able to withstand high temperature spikes and still be fully operational under normal operating conditions.

EXAMPLE VII

To demonstrate the differences between the stabilizing effect of various combinations of rare earth oxides and alkaline earth metal oxides, particles of a gamma alumina support (not the same as set forth in Example I) were impregnated to 3% by weight (dry basis) of a 55% rare earth oxide mixture and 45% alkaline earth metal oxide, dried, calcined, then calcined in air at 1200° C. for one hour and the resulting surface areas measured. Table VI sets forth the results and makes clear the superiority of the combination of lanthana and baria.

TABLE I

THE EFFICIENCY OF ALUMINA STABILIZATION

| STABILIZER | BET S.A. AFTER 1200° C. AIR EXPOSURE FOR 1 HR. m$^2$/g | XRD CeO$_2$ SIZE | Al$_2$O$_3$ PHASE |
|---|---|---|---|
| None | 2 | — | alpha |
| Bulk CeO$_2$ (no alumina) | 3 | 400 Å | — |
| 0.8% BaO | 6 | — | alpha |
| 20% CeO$_2$ | 11 | 240 Å | theta, alpha |
| 13% ZrO$_2$ | 17 | — | theta, alpha |
| 5% La$_2$O$_3$ | 21 | — | theta, alpha |
| 1.65% La-REO* + 1.35% BaO | 51 | — | theta |
| 10.2% SiO$_2$ | 85 | — | delta, theta |

*60% La$_2$O$_3$, 22% Nd$_2$O$_3$, 8% Pr$_6$O$_{11}$, 10% CeO$_2$

TABLE II

CONVERSION EFFICIENCY OF THERMALLY AGED Pd CONTAINING MONOLITHIC CATALYSTS
% CONVERSION AT A/F SHOWN

| | 14.45 | | | 14.55 | | | 14.65 | | | 14.75 | | | 14.85 | | |
|---|---|---|---|---|---|---|---|---|---|---|---|---|---|---|---|
| | HC | CO | $NO_x$ | HC | CO | $NO_x$ | HC | CO | $NO_x$ | HC | CO | $NO_x$ | HC | CO | $NO_x$ |
| $C_1$ | 50 | 23 | 21 | 57 | 32 | 21 | 62 | 40 | 22 | 67 | 48 | 21 | 71 | 56 | 21 |
| Ex. II | 68 | 30 | 44 | 72 | 36 | 42 | 77 | 45 | 40 | 82 | 52 | 38 | 85 | 62 | 37 |

TABLE III

LIGHT-OFF PERFORMANCE OF HYDROTHERMALLY AGED Pd CONTAINING MONOLITHIC CATALYSTS

| | LIGHT-OFF ACTIVITIES (UP TO 550° C.) | | | | | | $C_3H_8$ CON- |
|---|---|---|---|---|---|---|---|
| CAT- | $C_3H_8$ (°C.) | | | CO (°C.) | | | VERSION AT |
| ALYST | T50 | T75 | T90 | T50 | T75 | T90 | 538° C. % |
| Ex. III | 432 | 476 | 518 | 252 | 268 | 288 | 95 |
| $C_2$ | 471 | 510 | — | 260 | 271 | 291 | 87.5 |

Aging: 982° C./4 hours/air + 10% steam
Catalysts: 20 g/ft³ Pd; Corning 400 cell/in² substrate
Evaluation: 80,000 VHSV
Feed Gas: 0.8% CO, 3% $O_2$, 300 ppm $C_3H_8$, 500 ppm $NO_x$, 0.27% $H_2$, 10% $CO_2$, 10% $H_2O$, balance $N_2$.

TABLE IV

LIGHT-OFF PERFORMANCE OF THERMALLY AGED Pd CONTAINING MONOLITHIC CATALYSTS

| | LIGHT-OFF ACTIVITIES (UP TO 550° C.) | | | | | |
|---|---|---|---|---|---|---|
| | $C_3H_6$ (°C.) | | | CO (°C.) | | |
| CATALYST | T50 | T75 | T90 | T50 | T75 | T90 |
| $C_3$ | 515 | 520 | 523 | 537 | — | — |
| Ex. IV | 471 | 479 | 483 | 491 | 506 | — |
| Ex. V | 429 | 439 | 446 | 454 | 463 | 499 |

Aging: 1300° C./one hour/air
Catalysts: 15 g/ft³ Pd; NGK-X 400 cell/in² substrate*
Evaluation: 50,000 VHSV
Feed Gas: 1.0% CO, 1.35% $O_2$, 500 ppm $C_3H_6$, 1000 ppm $NO_x$, 0.33% $H_2$, 10% $CO_2$, 10% $H_2O$, balance $N_2$.

*magnesium aluminum titanate containing 10% MgO, 25% $Al_2O_3$, 55% $TiO_2$ and 10% minor oxide components

TABLE V

ACTIVITIES OF THERMALLY AGED Pd CONTAINING MONOLITHIC CATALYST

| Aging: | 1370° C./air/8 hours/cyclic |
|---|---|
| Evaluation: | 60,000 VHSV, 815° C. |
| Feed Gas: | 2.3% CO, 1000 ppm $C_3H_8$, 500 ppm $C_3H_6$, 1000 ppm $NO_x$, 1.6% $O_2$, 20 ppm $SO_2$ 10% $CO_2$, 10% $H_2O$, balance $N_2$ |

| % CONVERSION | | |
|---|---|---|
| HC (TOTAL) | CO | $NO_x$ (NET) |
| 99 | 90 | 64 |

TABLE VI

SURFACE AREAS OF GAMMA ALUMINA STABILIZED WITH 1.65% RARE EARTH OXIDE AND 1.35% ALKALINE EARTH METAL OXIDE AFTER CALCINATION AT 1200° C. FOR 1 HOUR

| | RARE EARTH | ALKALINE EARTH | SURFACE AREA IN M²/G |
|---|---|---|---|
| 1. | La* | Ba | 61 |
| 2. | La (mixture**) | Ba | 58 |
| 3. | La* | Mg | 50 |
| 4. | Nd* | Ba | 50 |
| 5. | Ce* | Ba | 39 |

*essentially pure
**60% $La_2O_3$, 10% $CeO_2$, 22% $Nd_2O_3$, 8% $Pr_6O_{11}$

We claim:

1. A catalyst effective at least for oxidation of carbon monoxide and unburned hydrocarbons in an exhaust stream, said catalyst remaining effective after exposure to a temperature greater than 1000° C., said catalyst comprising particles from each of the following three classes dispersed on a ceramic monolithic substrate:
   (a) stabilized gamma alumina support particles having palladium dispersed thereon, said gamma alumina support particles being stabilized by a method selected from the group consisting of:
      (i) incorporation of a combination of lanthana and baria into said particles and
      (ii) impregnation of said particles with an aqueous dispersion of a high molecular weight polyorganosiloxane followed by heating to a temperature which is effective to decompose said polyorganosiloxane;
   (b) promoter particles effective for promotion of combustion of carbon monoxide, said promoter consisting essentially of an oxide selected from the group consisting of bulk ceria, bulk zirconia and mixtures thereof; and
   (c) washcoat stabilization particles consisting essentially of a mixed oxide selected from the group consisting of cordierite, mullite, and magnesium aluminum titanate.

2. The catalyst of claim 1 wherein the weight of promoter dispersed on said substrate is at least about 5 percent of the total weight of the particles dispersed on said substrate.

3. The catalyst of claim 2 wherein the amount of palladium on the alumina particles dispersed on said monolithic substrate is sufficient to provide at least 5 grams of palladium per cubic foot of volume occupied by said monolithic substrate.

4. The catalyst of claim 2 wherein the amount of palladium on the alumina particles dispersed on said monolithic substrate is sufficient to provide at least 10 grams of palladium per cubic foot of volume occupied by said monolithic substrate.

5. The catalyst of claim 2 wherein the amount of palladium on the alumina particles dispersed on said monolithic substrate is sufficient to provide at least 15 grams of palladium per cubic foot of volume occupied by said monolithic substrate.

6. The catalyst of claim 1 wherein the amount of palladium on the alumina particles dispersed on said monolithic substrate is sufficient to provide at least 5 grams of palladium per cubic foot of volume occupied by said monolithic substrate.

7. The catalyst of claim 1 wherein the weight of $CeO_2$ promoter dispersed on said substrate is at least about 20 percent of the total weight of the particles dispersed on said substrate.

8. The catalyst of claim 1 wherein the weight of $CeO_2$ promoter dispersed on said substrate is at least about 25 percent of the total weight of the particles dispersed on said substrate.

9. The catalyst of any one of claims 1 through 8 wherein said monolithic substrate consists essentially of cordierite, mullite or magnesium aluminum titanate, said gamma alumina support particles are stabilized with a combination of lanthana and baria, said promoter particles consist essentially of ceria and said washcoat stabilization particles consist essentially of cordierite, the amount of lanthana and baria each being about at least 0.3% of the weight of the gamma alumina.

10. The catalyst of claim 9 wherein the ceria content of the gamma alumina particles upon which the palladium is deposited is less than 0.5% by weight.

11. The catalyst of claim 9 wherein the amount of stabilized gamma alumina on the monolithic substrate is from about 0.2 $g/in^3$ to about 5 $g/in^3$, the amount of washcoat stabilization particles present on the monolith is from about 0.05 to about 1.0 $g/in^3$ and the amount of promoter present is between about 0.1 and about 2.0 $g/in^3$.

12. The catalyst of any one of claims 1 through 8 wherein said monolithic substrate consists essentially of cordierite, mullite or magnesium aluminum titanate, said gamma alumina support particles have been stabilized by contacting with an aqueous dispersion of polyorganosiloxane and calcining, said promoter particles consist essentially of ceria or zirconia and said washcoat stabilization particles consist essentially of cordierite, the amount of $SiO_2$ remaining after calcining being from about 4 to 15% of the combined weight of the gamma alumina and $SiO_2$.

13. The catalyst of claim 12 wherein the ceria content of the gamma alumina particles upon which the palladium is deposited is less than 0.5% by weight.

14. The catalyst of claim 12 wherein the amount of stabilized gamma alumina on the monolithic substrate is from about 0.2 $g/in^3$ to about 5 $g/in^3$, the amount of washcoat stabilization particles present on the monolith is from about 0.05 to about 1.0 $g/in^3$ and the amount of promoter present is between about 0.1 and about 2.0 $g/in^3$.

* * * * *

UNITED STATES PATENT AND TRADEMARK OFFICE
CERTIFICATE OF CORRECTION

PATENT NO.  : 4,624,940
DATED       : November 25, 1986
INVENTOR(S) : Wan et al

It is certified that error appears in the above—identified patent and that said Letters Patent is hereby corrected as shown below:

In column, 1, line 18 delete [100], and add --1000--.

Signed and Sealed this

Twenty-first Day of April, 1987

*Attest:*

DONALD J. QUIGG

*Attesting Officer*      *Commissioner of Patents and Trademarks*